(12) United States Patent
Kim et al.

(10) Patent No.: US 11,947,104 B2
(45) Date of Patent: Apr. 2, 2024

(54) REFLECTIVE SPIRAL PHASE PLATE, AND APPARATUS FOR GENERATING LAGUERRE GAUSSIAN BEAM COMPRISING SAME

(71) Applicants: KOREA BASIC SCIENCE INSTITUTE, Yeonsu-gu (KR); INSTITUTE FOR BASIC SCIENCE, Yuseong-gu (KR); GWANGJU INSTITUTE OF SCIENCE AND TECHNOLOGY, Buk-gu (KR)

(72) Inventors: I Jong Kim, Seo-gu (KR); Ji Yong Bae, Yuseong-gu (KR); Hong Seung Kim, Sejong (KR); Geon Hee Kim, Sejong (KR); Ki Soo Chang, Yuseong-gu (KR); Cheonha Jeon, Jinju (KR); Il Woo Choi, Buk-gu (KR); Chang Hee Nam, Buk-gu (KR)

(73) Assignees: KOREA BASIC SCIENCE INSTITUTE, Yeonsu-gu (KR); INSTITUTE FOR BASIC SCIENCE, Yuseong-gu (KR); GWANGJU INSTITUTE OF SCIENCE AND TECHNOLOGY, Buk-gu (KR)

( * ) Notice: Subject to any disclaimer, the term of this patent is extended or adjusted under 35 U.S.C. 154(b) by 272 days.

(21) Appl. No.: 17/641,770

(22) PCT Filed: Sep. 9, 2020

(86) PCT No.: PCT/KR2020/012155
§ 371 (c)(1),
(2) Date: Mar. 9, 2022

(87) PCT Pub. No.: WO2021/049867
PCT Pub. Date: Mar. 18, 2021

(65) Prior Publication Data
US 2022/0382041 A1    Dec. 1, 2022

(30) Foreign Application Priority Data

Sep. 10, 2019 (KR) .......................... 10-2019-0112290
Sep. 4, 2020 (KR) .......................... 10-2020-0113301

(51) Int. Cl.
$G02B\ 26/06$ (2006.01)
$G02B\ 26/08$ (2006.01)
$G02B\ 27/00$ (2006.01)

(52) U.S. Cl.
CPC ......... G02B 26/06 (2013.01); G02B 26/0825 (2013.01); G02B 27/0068 (2013.01)

(58) Field of Classification Search
CPC . G02B 26/06; G02B 26/0825; G02B 27/0068
(Continued)

(56) References Cited

U.S. PATENT DOCUMENTS

| 5,283,796 A | 2/1994 | Fink |
| 8,796,614 B2 * | 8/2014 | Song ................... G02B 27/286 |
| | | 315/501 |

(Continued)

FOREIGN PATENT DOCUMENTS

| KR | 20040026109 A | 3/2004 |
| KR | 20110096150 A | 8/2011 |

(Continued)

OTHER PUBLICATIONS

International Search Report for PCT/KR2020/012155 dated Dec. 11, 2020.

*Primary Examiner* — William Choi
(74) *Attorney, Agent, or Firm* — MARSHALL, GERSTEIN & BORUN LLP

(57) ABSTRACT

A spiral phase plate, according to one embodiment, for generating a Laguerre Gaussian beam by reflecting an incident beam emitted from a light source, may comprise: a first quadrant area in which the step height increase rate per (Continued)

unit angle decreases progressively in one direction from the point with the lowest step height to the point with the highest step height; and a second quadrant area in which the step height increase rate per unit angle increases progressively in the one direction.

13 Claims, 13 Drawing Sheets

(58) Field of Classification Search
 USPC .......................................................... 359/291
 See application file for complete search history.

(56)  References Cited

U.S. PATENT DOCUMENTS

| 9,377,617 | B2 | 6/2016 | Bovino et al. |
| 2016/0360605 | A1 | 12/2016 | Clark et al. |
| 2018/0287262 | A1 | 10/2018 | Patri et al. |

FOREIGN PATENT DOCUMENTS

| KR | 20180097001 A | 8/2018 |
| WO | WO-2006072581 A1 | 7/2006 |

\* cited by examiner

REFLECTIVE SPIRAL PHASE PLATE, AND APPARATUS FOR GENERATING LAGUERRE GAUSSIAN BEAM COMPRISING SAME

TECHNICAL FIELD

The following description relates to a reflective spiral phase plate, and an apparatus for generating a Laguerre Gaussian beam comprising the same.

BACKGROUND ART

A spiral phase plate (SPP), which is an element that converts an inputted beam into a donut-shaped Laguerre Gaussian beam, has a spiral shape in which a step changes according to a radial position.

In general, the SPP has been used as a transmission scheme for converting a beam that is positioned on a beam path and transmitted into a donut-shaped beam, as illustrated in FIG. 1.

However, a conventional transmissive SPP uses a scheme for transmitting a beam, and thus there is a problem in that an output of the beam may be reduced or the beam may be distorted due to a dispersion effect, an energy loss, and the like caused by transmission. In addition, when ultrashort laser pulses are used, self-phase modulation occurs due to a nonlinear shape occurring in a material of the transmissive SPP, and thus there is a problem in that a pulse width of a laser becomes longer and a spectrum of the laser is shortened.

Accordingly, there is an increasing need for an apparatus and method capable of converting a beam into a donut-shaped beam using the SPP, and removing a negative effect caused by transmission of the beam.

The above-mentioned background art is possessed or acquired by the inventor in a derivation process of the present invention, and is not necessarily a known technology disclosed to the general public prior to filing of the present application.

DISCLOSURE OF THE INVENTION

Technical Goals

An aspect provides a reflective spiral phase plate, and an apparatus for generating a Laguerre Gaussian beam comprising the same.

Technical Solutions

According to an aspect, there is provided a spiral phase plate for generating a Laguerre Gaussian beam by reflecting an incident beam emitted from a light source, the spiral phase plate including a first quadrant area in which a step increase rate per unit angle decreases progressively in one direction from a point with a lowest step to a point with a highest step, and a second quadrant area in which a step increase rate per unit angle increases progressively in the one direction.

The spiral phase plate may further include a third quadrant area in which a step height increase rate per unit angle is the same as that of the first quadrant area, and a fourth quadrant area in which a step height increase rate per unit angle is the same as that of the second quadrant area.

The spiral phase plate may be divided into a plurality of segments with a same step height according to a radial angle.

Based on a direction in which a step size increases, a radial angle range occupied by the plurality of segments in the spiral phase plate may sequentially increase in the first quadrant area and the third quadrant area, and may sequentially decrease in the second quadrant area and the fourth quadrant area.

The spiral phase plate may have each step height that sequentially increases according to a radial angle.

The spiral phase plate may have a plurality of sections in which a step continuously increases according to a radial angle.

The plurality of sections in which the step continuously increases in the spiral phase plate may be formed at positions radially symmetrical to each other with respect to a line for dividing the respective first quadrant area, second quadrant area, third quadrant area, and fourth quadrant area.

The spiral phase plate may have a circular shape.

According to another aspect, there is provided an apparatus for generating a Laguerre Gaussian beam, the apparatus including a beam generator configured to emit an incident beam, and a spiral phase plate configured to generate a Laguerre Gaussian beam by reflecting an incident beam inputted from the beam generator. The spiral phase plate may include a first quadrant area in which a step increase rate per unit angle decreases progressively in one direction from a point with a lowest step to a point with a highest step, and a second quadrant area in which a step increase rate per unit angle increases progressively in the one direction.

A height h from the point with the lowest step to the point with the highest step on the spiral phase plate may be determined through Equation below.

$$h = \frac{n\lambda}{2\cos\theta} \quad \text{(Equation)}$$

(h: an overall step height of a spiral phase plate, n: a topological quantum number, $\lambda$: a wavelength of an incident beam, $\theta$: an incidence angle of an incident beam with respect to a spiral phase plate)

At a point of a radial angle $\varphi$ on the spiral phase plate, a relative height H to the point with the lowest step may be determined through Equation below.

$$H = \frac{n\lambda}{4\pi\cos\theta} \cdot \tan^{-1}\left[\frac{\tan\varphi}{\sec\theta}\right] \quad \text{(Equation)}$$

(H: a step height at a specific phase angle, n: a topological quantum number, $\lambda$: a wavelength of an incident beam, $\theta$: an incidence angle of an incident beam with respect to a spiral phase plate, $\varphi$: a phase angle)

The spiral phase plate may have a circular shape with a diameter of a length greater than or equal to a length of a major axis of an oval formed on the spiral phase plate by projecting the incident beam.

A portion extending in a radial direction from a central portion of the spiral phase plate having the circular shape may have a same step.

Advantageous Effects

According to a reflective spiral phase plate according to an aspect, it is possible to remove a dispersion effect, an energy loss, and a change in a pulse width and spectrum of a laser pulse occurring in a conventional transmission scheme, thereby minimizing beam distortion caused by transmission.

According to the reflective spiral phase plate according to an aspect, manufacturing is easy and large-area manufacturing is possible, and thus it may be also used for a high-power laser.

BEST MODE FOR CARRYING OUT THE INVENTION

Figure 1:
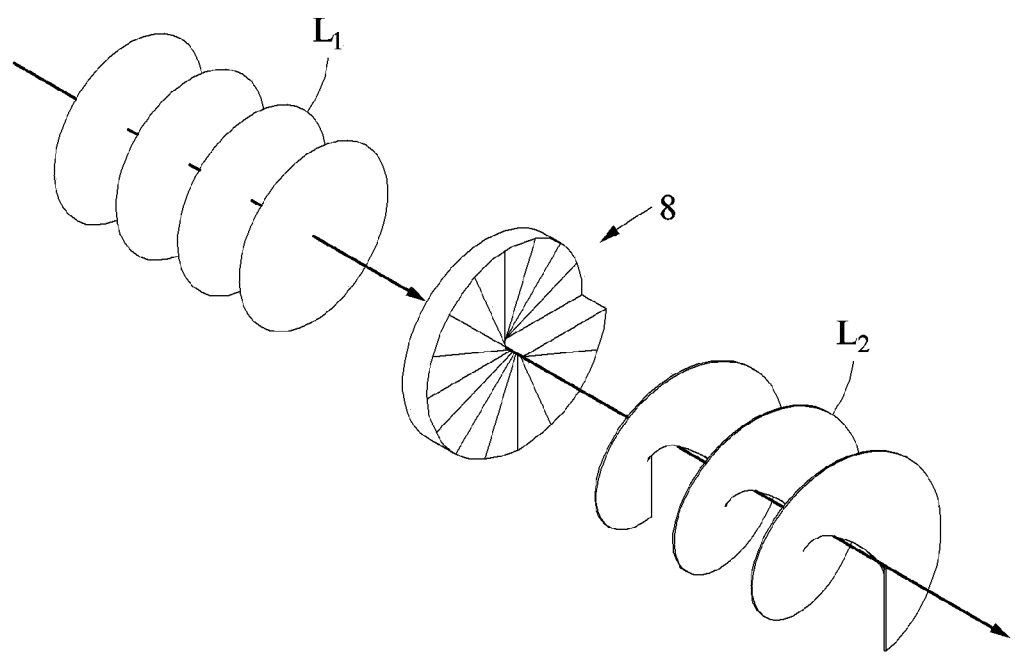
FIG. 1 is a diagram illustrating a conventional transmissive spiral phase plate.

Hereinafter, example embodiments will be described in detail with reference to the illustrative drawings. Regarding reference numerals assigned to components in each drawing, it should be noted that the same components will be designated by the same reference numerals, wherever possible, even though they are illustrated in different drawings. When describing the example embodiments, detailed description of well-known related structures or functions will be omitted when it is deemed that such description will cause ambiguous interpretation of the example embodiments.

In addition, it will be understood that, although the terms first, second, A, B, (a), (b), and the like may be used herein to describe various components of the example embodiments, these terms are only used to distinguish one component from another component and essential, order, or sequence of corresponding components are not limited by these terms. It will be understood that when one component is referred to as being "connected to", "coupled to", or "linked to" another component, one component may be "connected to", "coupled to", or "linked to" another component via a further component although one component may be directly connected to or directly linked to another component.

The same name may be used to describe a component included in an example embodiment and a component having a common function in another example embodiment. Unless otherwise mentioned, the description on the example embodiment may be applicable to the other example embodiment and thus, duplicated description will be omitted for conciseness.

Figure 2:
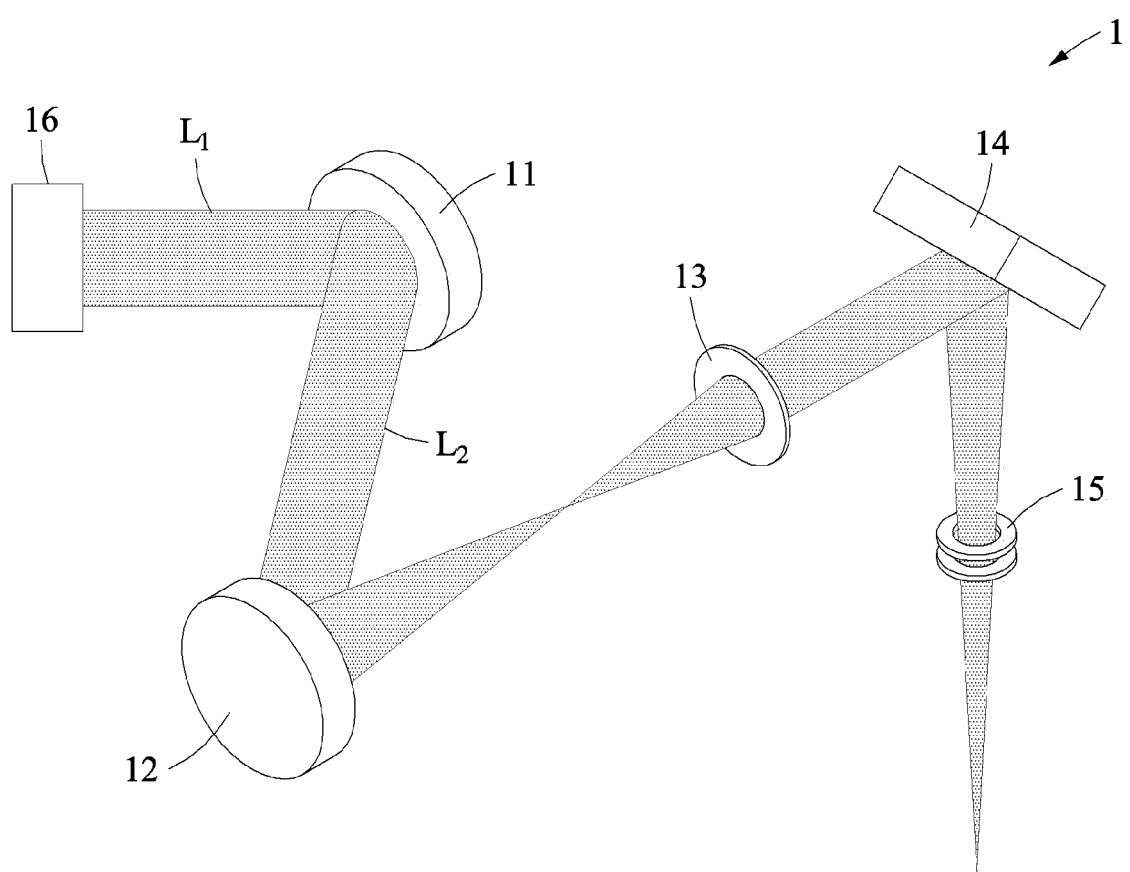
FIG. 2 is a diagram illustrating an apparatus for generating a Laguerre Gaussian beam according to an example embodiment.

FIG. 2 is a diagram illustrating an apparatus for generating a Laguerre Gaussian beam according to an example embodiment.

Referring to FIG. 2, a Laguerre Gaussian beam generating apparatus 1 according to an example embodiment converts an incident beam $L_1$ into a Laguerre Gaussian beam $L_2$ using a reflective spiral phase plate 11, and outputs the Laguerre Gaussian beam $L_2$.

For example, the Laguerre Gaussian beam generating apparatus 1 may include a beam generator 16 that generates an incident beam $L_1$, a spiral phase plate 11 that converts the incident beam $L_1$ into the Laguerre Gaussian beam $L_2$ and reflects the Laguerre Gaussian beam $L_2$, and an off-axis parabolic mirror 12 that reflects and focuses the incident Laguerre Gaussian beam $L_2$ outwards in an axial direction.

For example, the Laguerre Gaussian beam generating apparatus 1 may further include an apochromatic lens 13 that compensates for chromatic aberration used to focus the Laguerre Gaussian beam $L_2$, and a neutral-density (ND) filter 15 that adjusts an intensity of the focused beam.

The beam generator 16 may output a laser beam having a wavefront of a plane perpendicular to an optical axis, and the laser beam may be referred to as the incident beam $L_1$.

For example, the incident beam $L_1$ may be a Gaussian beam having an amplitude distribution of a wave on a cross section perpendicular to the optical axis, the amplitude distribution represented by a Gaussian function.

A beam having the amplitude distribution represented by the Gaussian function may be outputted, and the beam may be referred to as the incident beam $L_1$.

The incident beam $L_1$ outputted from the beam generator 16 may be incident with a set incidence angle with respect to a reflective surface of the spiral phase plate 11, and then the incident beam $L_1$ may be converted into a Laguerre Gaussian beam having a spiral wavefront due to a spiral structure of the reflective surface, and the Laguerre Gaussian beam may be reflected, and the Laguerre Gaussian beam may be referred to as the Laguerre Gaussian beam $L_2$ having a donut-shaped light intensity distribution and a light phase that continuously increases according to a radial direction with respect to the optical axis.

A detailed description of the spiral phase plate 11 will be described later with reference to FIGS. 3 to 10.

Figure 3:
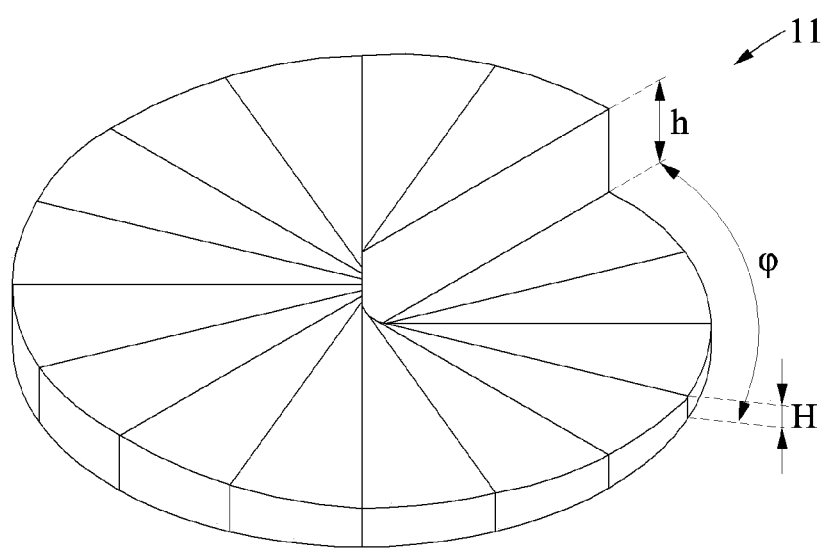
FIG. 3 is a perspective view of a reflective spiral phase plate according to an example embodiment.
Figure 4:
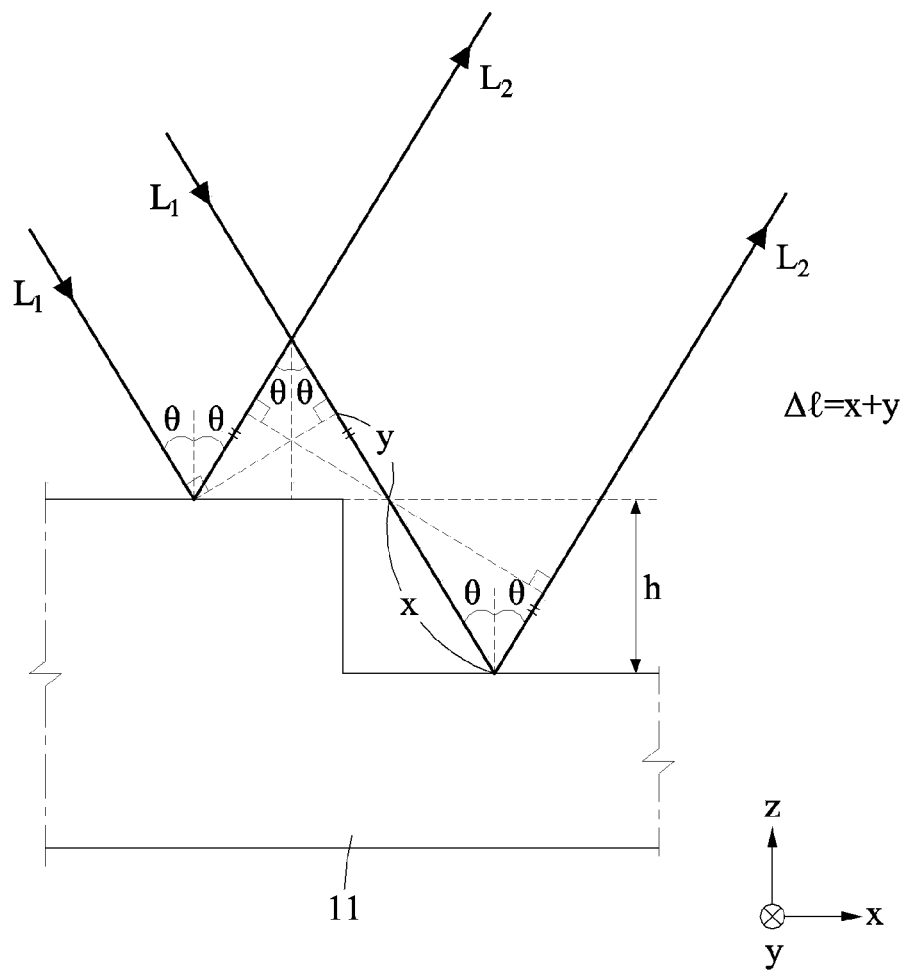
FIG. 4 is a diagram illustrating a difference in paths reflected after an incident beam is incident according to a step of a spiral phase plate according to an example embodiment.
Figure 5:
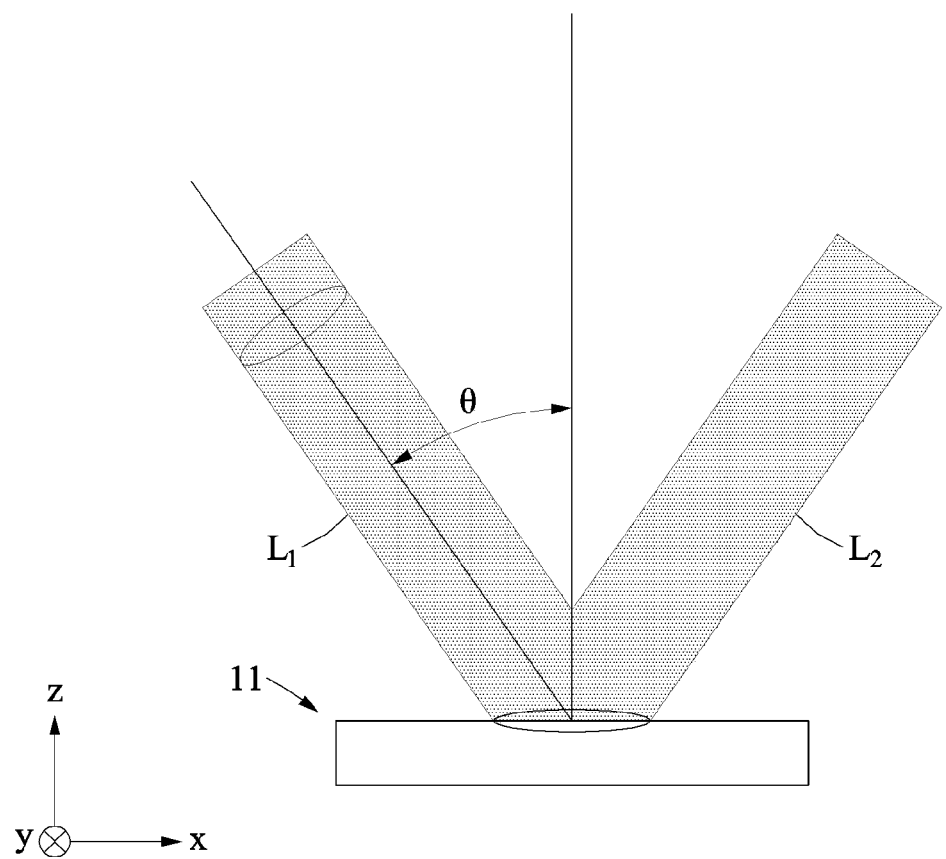
FIG. 5 is a side view illustrating a path through which an incident beam is incident and reflected on a spiral phase plate according to an example embodiment.
Figure 6:
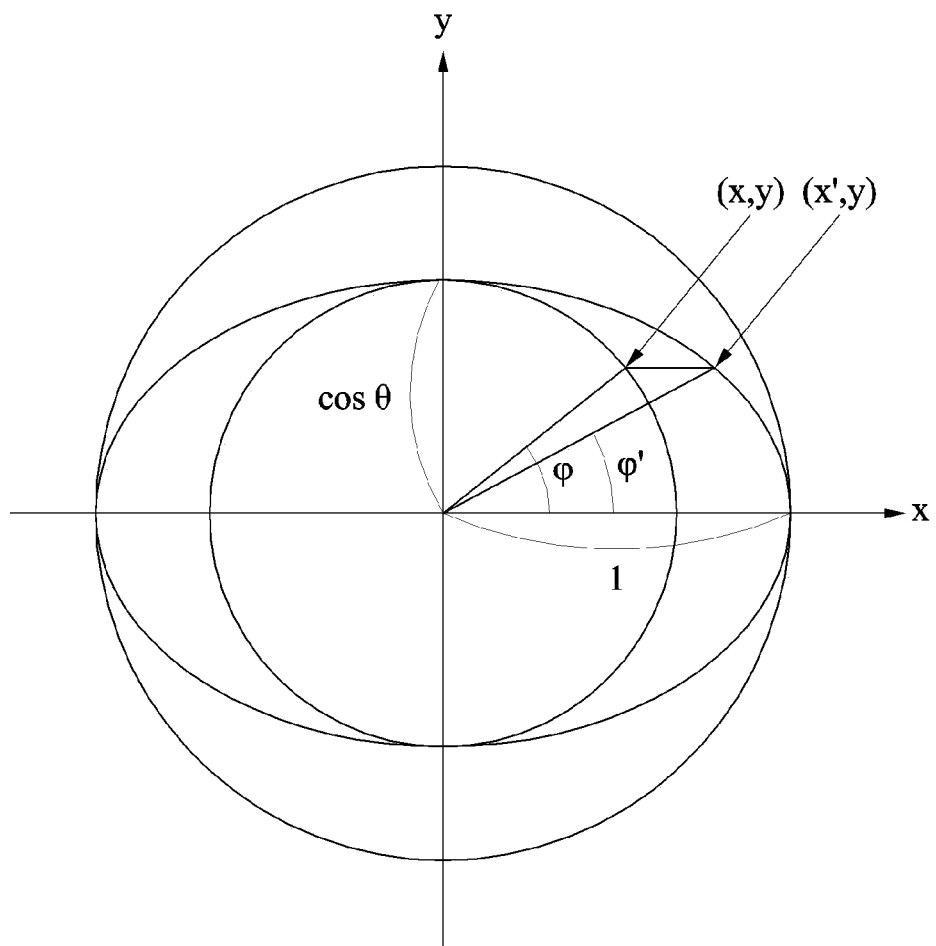
FIG. 6 is a plan view illustrating an area where an incident beam is incident and reflected on a spiral phase plate according to an example embodiment.
Figure 7:
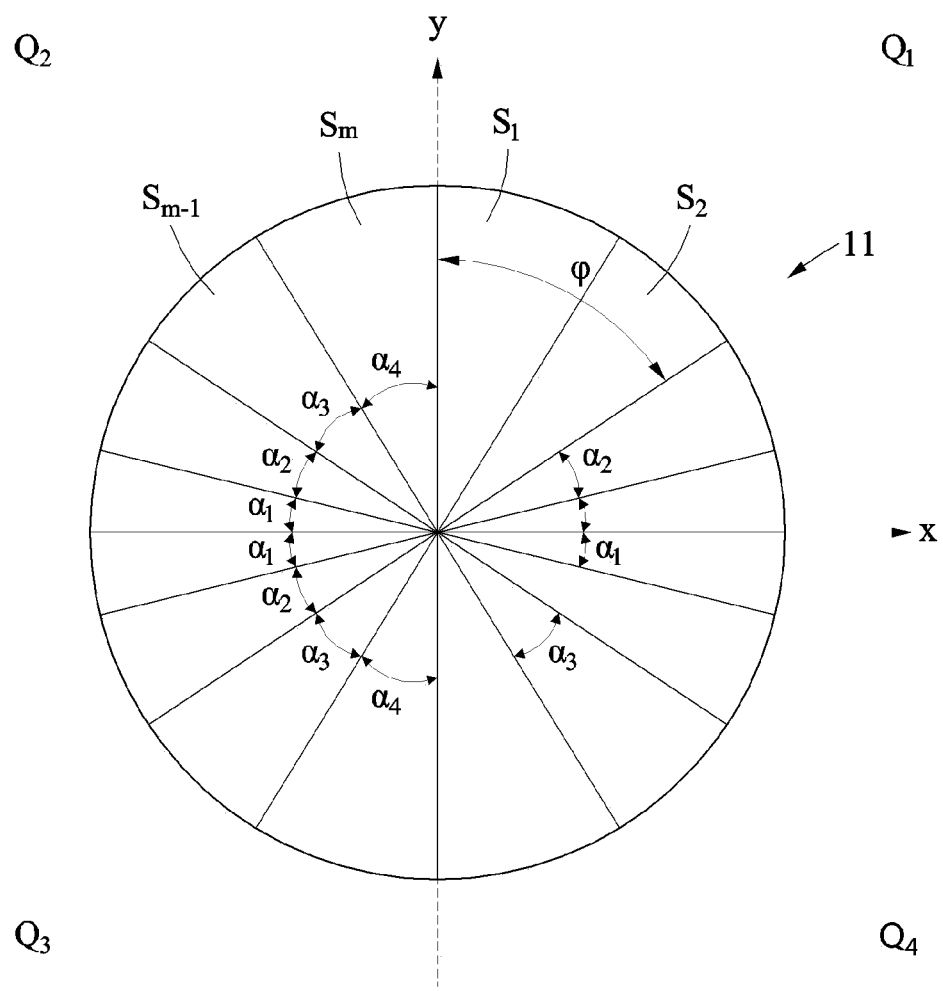
FIG. 7 is a plan view illustrating a plurality of segments divided to have different area sizes according to an angular position of a spiral phase plate according to an example embodiment.
Figure 8:
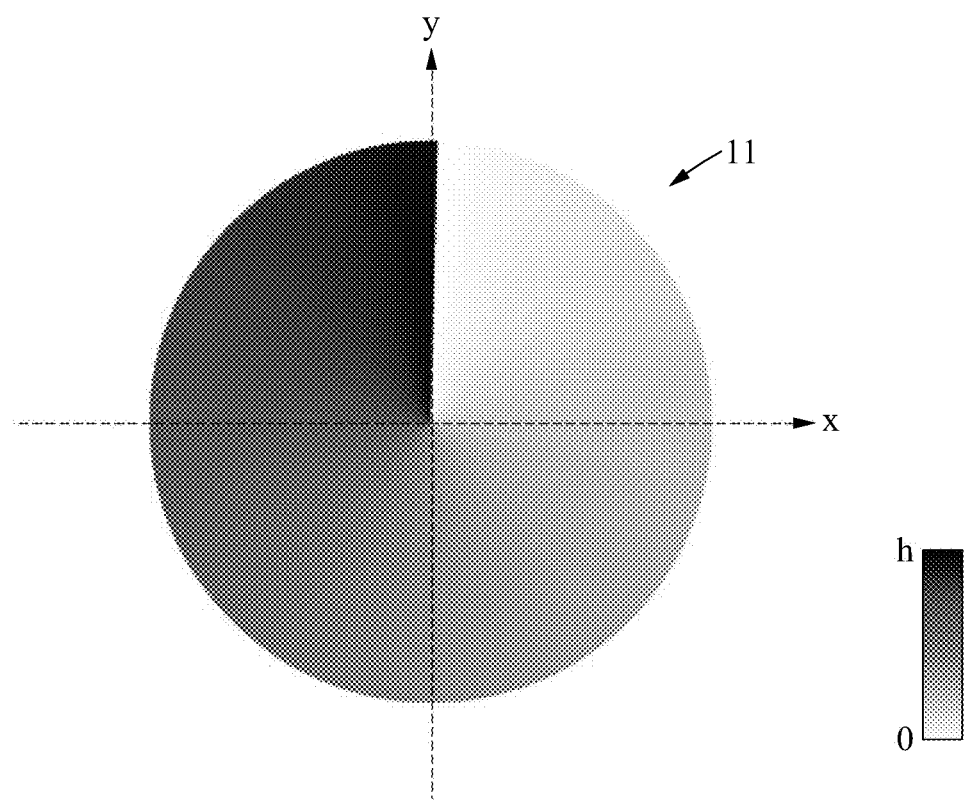
FIG. 8 is a plan view of a spiral phase plate according to an example embodiment.

FIG. 3 is a perspective view of a reflective spiral phase plate according to an example embodiment, FIG. 4 is a diagram illustrating a difference in paths reflected after an incident beam is incident according to a step of a spiral phase plate according to an example embodiment, FIG. 5 is a side view illustrating a path through which an incident beam is incident and reflected on a spiral phase plate according to an example embodiment, FIG. 6 is a plan view illustrating an area where an incident beam is incident and reflected on a spiral phase plate according to an example embodiment, FIG. 7 is a plan view illustrating a plurality of segments divided to have different area sizes according to an angular position of a spiral phase plate according to an example embodiment, and FIG. 8 is a plan view of a spiral phase plate according to an example embodiment.

Referring to FIGS. 3 to 8, the spiral phase plate 11 according to an example embodiment may convert an incident beam into a donut-shaped Laguerre Gaussian beam, and reflect the Laguerre Gaussian beam. A reflective surface of the spiral phase plate 11 may have a spiral shape in which a step changes according to a radial position. For example, the spiral phase plate 11 may have a circular shape.

For example, the spiral phase plate 11 may have a step with a different height for each radial phase angle φ with respect to a central line (y-axis of the drawing) that crosses the spiral phase plate 11 in a planar direction from a central point of a reflection area.

For example, as illustrated in FIGS. 3 to 8, the spiral phase plate 11 may have a spiral shape in which a protruding height increases according to a radial angle.

For example, a portion extending in a radial direction from a central portion of the circular spiral phase plate 11 may have the same step. For example, the spiral phase plate 11 may have a shape in which a step height is sequentially increased according to the radial phase angle φ. Here, it should be noted that the step height that sequentially increases may refer to both (i) a step height may continuously increase as illustrated in FIG. 3, and (ii) a step height of each of a plurality of distinct areas may discontinuously (in a stepwise manner) increase as illustrated in FIG. 7.

Hereinafter, in the description and drawings of the present application, the phase angle φ will be described and illustrated as being an angle measured in a clockwise direction with respect to the y-axis. However, it should be noted that the phase angle φ refers to an angle of a direction from a point with a low step height toward a point with a relatively high step height on the reflective surface, and a reference and direction for measuring the phase angle φ are not limited thereto.

For example, as illustrated in FIGS. 4 to 6, the incident beam $L_1$ may be incident obliquely along an x-axis direction and a z-axis direction with respect to a central axis (z-axis in the drawing) perpendicular to a plane of the spiral phase plate 11, and may be irradiated with an incidence angle θ that is set with respect to the central axis.

The Laguerre Gaussian beam $L_2$ reflected from the spiral phase plate 11 may be reflected while forming a reflection angle equal to the incidence angle θ with respect to the central axis.

For example, when the spiral phase plate 11 is viewed vertically from above as illustrated in FIG. 8, the spiral phase plate 11 may be divided into four sections with respect to a vertical central axis (x-axis and y-axis in the drawing) that crosses the reflection area in transverse and longitudinal directions, and for example, may be divided into a first quadrant area $Q_1$, a second quadrant area $Q_2$, a third quadrant area $Q_3$, and a fourth quadrant area $Q_4$ in sequence along a counterclockwise direction with respect to the x-axis.

For example, a height h from a point with a lowest step to a point with a highest step on the spiral phase plate 11 may be determined by a phase shift ΔØ of the Laguerre Gaussian beam $L_2$ to be outputted, a wavelength λ of the incident beam $L_1$, and an incidence angle θ of the incident beam $L_1$ incident on the spiral phase plate 11, as illustrated in FIG. 4.

First, the phase shift ΔØ of the Laguerre Gaussian beam $L_2$ may be derived using Equation 1.

$$\Delta\emptyset = \frac{2\pi}{\lambda}\Delta l \quad \text{[Equation 1]}$$

(ΔØ: a phase shift of a Laguerre Gaussian beam, λ: a wavelength of an incident beam, Δl: an optical path difference according to a step height)

In addition, an optical path difference Δl according to an overall step height h of the spiral phase plate 11 according to the incidence angle θ may be derived based on a geometrical relationship of the beam path illustrated in FIG. 4.

Specifically, an optical path difference Δl between an optical path incident on a highest step of the spiral phase plate 11 and an optical path incident on a lowest step of the spiral phase plate 11 may be represented as the sum of x and y illustrated in FIG. 4. In addition, according to a trigonometric function, x may be represented as a relationship between the overall step height h and the incidence angle θ, and y may be represented as a relationship between x and 2θ. In conclusion, the optical path difference Δl may be represented as the relationship between the overall step height h and the incidence angle θ, using Equation 2 below.

$$\Delta l = 2h \cos\theta \quad \text{[Equation 2]}$$

(h: an overall step height of a spiral phase plate, Δl: an optical path difference according to a step height, θ: an incidence angle of an incident beam)

Here, when the overall step height h of the spiral phase plate 11 is calculated based on Equations 1 and 2 above, the overall step height h may be represented using Equation 3 below.

$$h = \frac{\Delta\emptyset \lambda}{4\pi\cos\theta} \quad \text{[Equation 3]}$$

(h: an overall step height of a spiral phase plate, ΔØ: a phase shift of a Laguerre Gaussian beam, λ: a wavelength of an incident beam, θ: an incidence angle of an incident beam)

The phase shift ΔØ of the Laguerre Gaussian beam $L_2$ may be determined by a topological quantum number n, in other words, a topological charge, and as a result, the phase shift ΔØ of the Laguerre Gaussian beam $L_2$ may be calculated as 2nπ according to the topological quantum number n. When 2nπ is substituted into Equation 3, the overall step height h of the spiral phase plate 11 may be represented using Equation 4 below.

$$h = \frac{2n\pi\lambda}{4\pi\cos\theta} = \frac{n\lambda}{2\cos\theta} \quad \text{[Equation 4]}$$

(h: an overall step height of a spiral phase plate, n: a topological quantum number, λ: a wavelength of an incident beam, θ: an incidence angle of an incident beam)

Based on Equation 4, a step height H at a specific radial phase angle φ of the spiral phase plate 11 may be calculated.

However, the incident beam $L_1$ is incident with the incidence angle θ with respect to the spiral phase plate 11, and thus an area where the incident beam $L_1$ is irradiated to the spiral phase plate 11 has an oval shape as illustrated in FIG. 6. Thus, the Laguerre Gaussian beam $L_2$ reflected from the incident beam $L_1$ may have an intensity of a beam distributed for each phase that is disproportionately formed due to a radius difference between a semi major axis direction (x-axis direction of the drawing) and a semi minor axis direction (y-axis direction of the drawing) of an oval.

In other words, the spiral phase plate 11 may have a step height increase rate dH/dφ per unit phase angle that is not constant according to the incidence angle θ at which the incident beam L₁ is incident on the spiral phase plate 11.

Therefore, in order to form the Laguerre Gaussian beam L₂ having the same intensity distribution for each phase, a phase angle φ of the spiral phase plate 11 may be converted into a correction angle φ' of an oval formed by the incident beam L₁. The correction angle φ' may be calculated using Equation 5 below, based on a geometric relationship between the oval illustrated in FIG. 6 and a circle having a semi minor axis of the oval as a radius.

$$\varphi' = \tan^{-1}\left[\frac{\tan\varphi}{\sec\theta}\right] \qquad [\text{Equation 5}]$$

(θ: an incidence angle of an incident beam, φ': a correction angle, φ: a phase angle)

For example, the spiral phase plate 11 may have a circular shape having a diameter of a length greater than or equal to a length of a major axis of an oval area formed by irradiating the incident beam L₁.

By proportionally applying the calculated correction angle φ' to Equation 4, a step height H at a specific radial phase angle φ of the spiral phase plate 11 may be finally derived using Equation 6 below.

$$H = \frac{\varphi'}{2\pi} \cdot h = \frac{\varphi'}{2\pi} \cdot \frac{n\lambda}{2\cos\theta} = \frac{n\lambda}{4\pi\cos\theta} \cdot \tan^{-1}\left[\frac{\tan\varphi}{\sec\theta}\right] \qquad [\text{Equation 6}]$$

(H: a step height at a specific phase angle, n: a topological quantum number, λ: a wavelength of an incident beam, θ: an incidence angle of an incident beam, φ: a phase angle)

According to the above structure of the spiral phase plate 11, the respective four quadrant areas Q₁, Q₂, Q₃, and Q₄ may not have the same step height increase rate per unit phase angle based on a clockwise direction.

For example, in the first quadrant area Q₁ and the third quadrant area Q₃, a step height increase rate per unit phase angle may progressively increase from a point with a low step to a point with a high step. In the second quadrant area Q₂ and the fourth quadrant area Q₄, a step height increase rate per unit phase angle may progressively decrease from a point with a low step to a point with a high step.

For example, based on a direction in which a step size increases, the step height increase rates per unit phase angle of the first quadrant area Q₁ and the third quadrant area Q₃ may be the same, and the step height increase rates per unit phase angle of the second quadrant area Q₂ and the fourth quadrant area Q₄ may be the same.

For example, the spiral phase plate 11 may be divided into a plurality of (m) segments S (S₁ to S_M) with the same step height according to a radial phase angle.

The plurality of segments S each may be set to have a specific phase angle range α in a radial direction. For example, the plurality of segments S each may have a step height H corresponding to a phase angle φ at which each segment is positioned, as shown in Equation 6.

For example, phase angle ranges α formed by the plurality of segments S may be set differently from each other based on phase angles φ at which the segments S are positioned, and the quadrant areas Q₁, Q₂, Q₃, and Q₄ in which the segments S are positioned.

For example, when it is assumed that the plurality of segments S are spaced apart from each other at the same radial distance and divided based on the direction in which the step size increases (clockwise direction in FIG. 8), phase angles φ at which the respective segments S start and phase angles φ at which the respective segments S end each may be converted into a correction angle φ', as shown in Equation 5.

For example, based on the direction in which the step size increases, the phase angle ranges α of the plurality of segments S may sequentially increase in the first quadrant area Q₁ and the third quadrant area Q₃, and may sequentially decrease in the second quadrant area Q₂ and the fourth quadrant area Q₄.

In other words, the phase angle ranges α of the plurality of segments S may sequentially increase as radial positions of the corresponding segments S becomes progressively adjacent to a major axis (x-axis of the drawing) of an irradiation area of the oval-shaped incident beam L₁.

For example, when the spiral phase plate 11 is segmented into sixteen segments (S₁ to S₁₆) as illustrated in FIG. 7, the segments S may have phase angle ranges α₁, α₂, α₃, and α₄ in an order of the segments S adjacent to the major axis (x-axis of the drawing) of the irradiation area, and the phase angle ranges α₁, α₂, α₃, and α₄ may sequentially increase.

Figure 9:
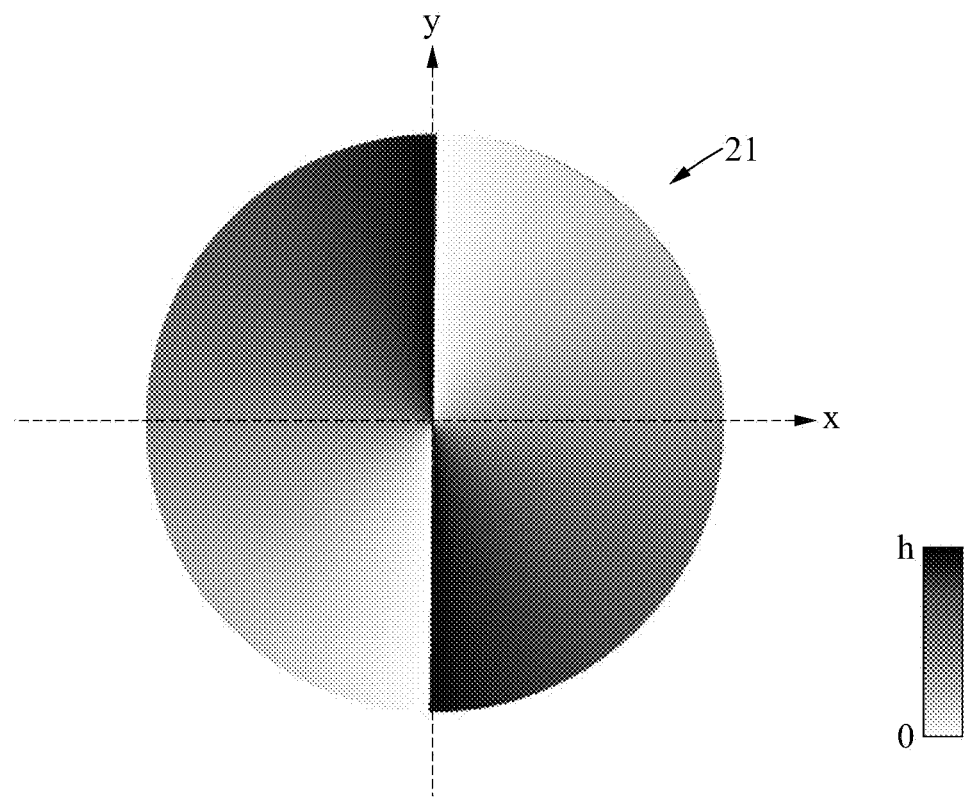
FIG. 9 is a plan view of a spiral phase plate according to an example embodiment.
Figure 10:
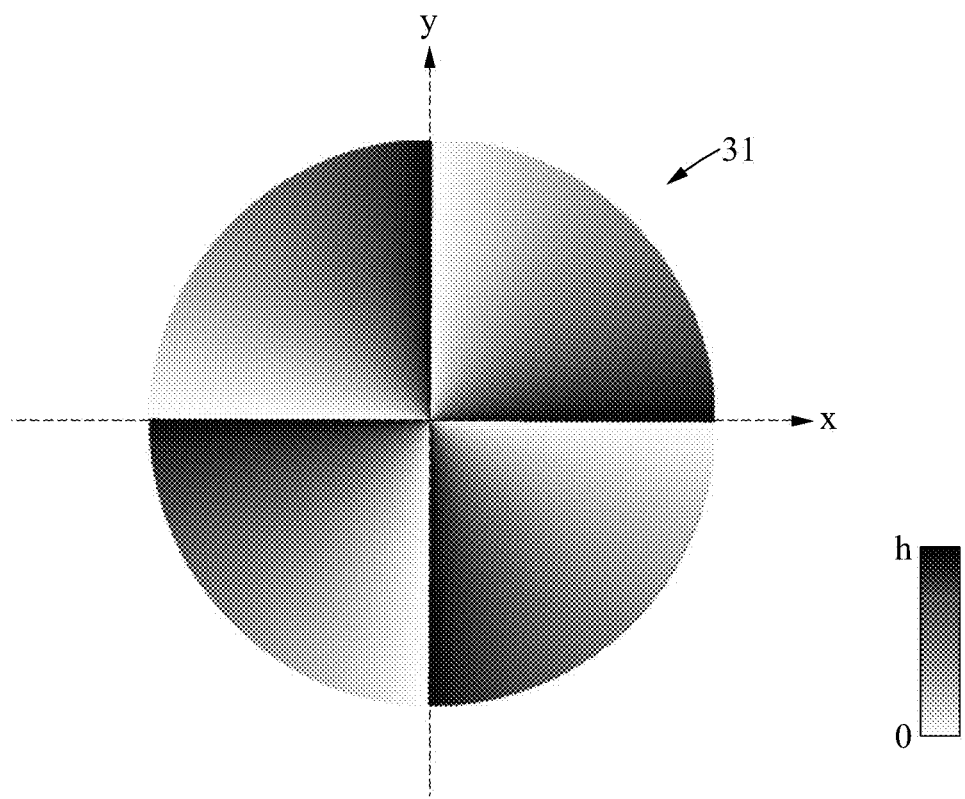
FIG. 10 is a plan view of a spiral phase plate according to an example embodiment.

FIG. 9 is a plan view of a spiral phase plate according to an example embodiment, and FIG. 10 is a plan view of a spiral phase plate according to an example embodiment.

Referring to FIGS. 9 and 10, spiral phase plates 21 and 31 having a structure different from that of the spiral phase plate 11 illustrated in FIGS. 3 to 8 can be confirmed.

Specifically, the spiral phase plate 11 illustrated in FIGS. 3 to 8 has one section in which a step height is continuously increased according to a radial phase angle in a section where a radial angle is 0° to 360°. Conversely, the spiral phase plates 21 and 31 according to an example embodiment respectively illustrated in FIGS. 9 and 10 may include a plurality of sections in which a step height continuously increases according to a phase angle in the section where the radial angle is 0° to 360°.

First, the spiral phase plate 21 illustrated in FIG. 9 may have a structure in which a section in which a step height increases within a radial section is segmented into two sections.

For example, a step section segmented into two sections on the spiral phase plate 21 may be divided using each of 0° and 180° as a starting point, and step height increase rates per unit phase angle in the respective sections may be the same.

In the spiral phase plate 31 illustrated in FIG. 10, a section in which a height increases within a radial section may include four sections.

For example, a step section segmented into four sections on the spiral phase plate 31 may be divided on each quadrant area using each of 0°, 90°, 180°, 270°, and 360° as a starting point. For example, in step sections of the first quadrant area Q₁ and the third quadrant area Q₃, a step height increase rate per unit phase angle may progressively increase from a point with a low step height to a point with a high step height, and in step sections of the quadrant area Q₂ and the fourth quadrant area Q₄, a step height increase rate per unit phase angle may progressively decrease from a point with a low step height to a point with a high step height.

It would not be difficult for those skilled in the art to understand that it is also possible to have a structure segmented into an arbitrary number of sections within a radial section in addition to the spiral phase plates 21 and 31 illustrated in FIGS. 9 and 10, and structural features of the spiral phase plate 11 described above with reference to FIGS. 3 to 8 are applicable based on the same principle regardless of the number of segmented sections.

For example, the number of sections in which a step continuously increases within a spiral phase plate may be a multiple of 2. For example, a plurality of sections in which a step continuously increases in the spiral phase plate may be formed at positions radially symmetrical to each other with respect to a line for dividing the respective quadrant areas $Q_1$, $Q_2$, $Q_3$, and $Q_4$.

Figure 11:
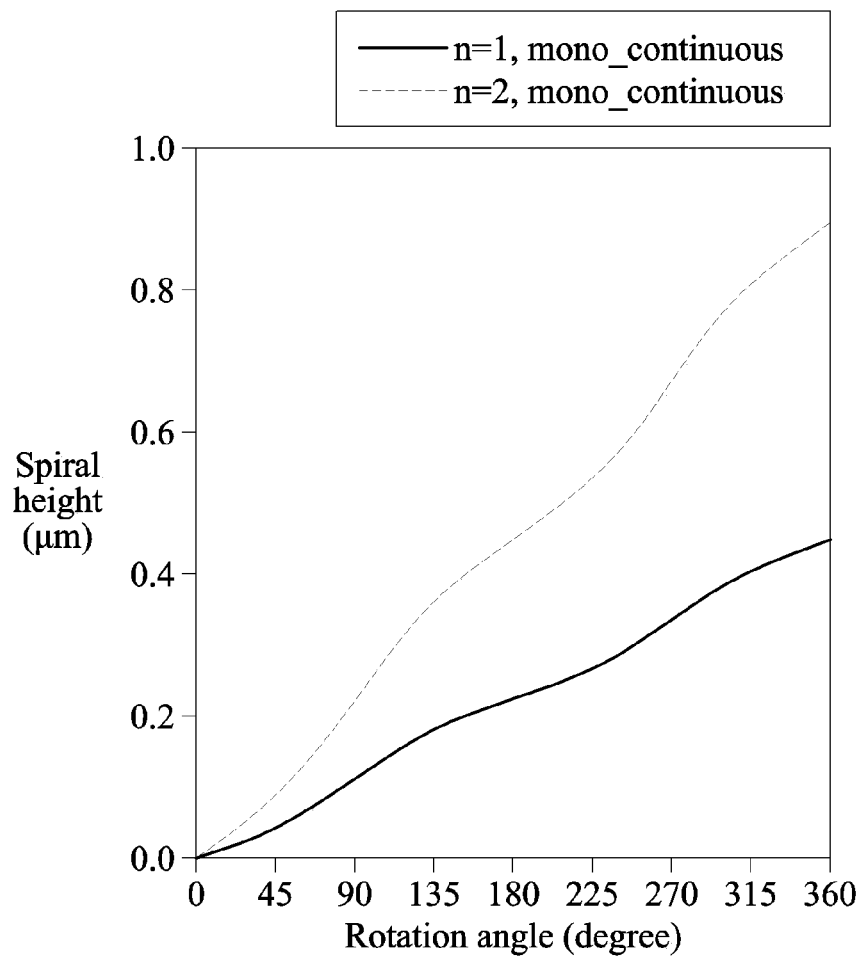
FIG. 11 is a graph illustrating a step height for each angle of a spiral phase plate designed to have a step height that continuously increases according to an example embodiment.
Figure 12:
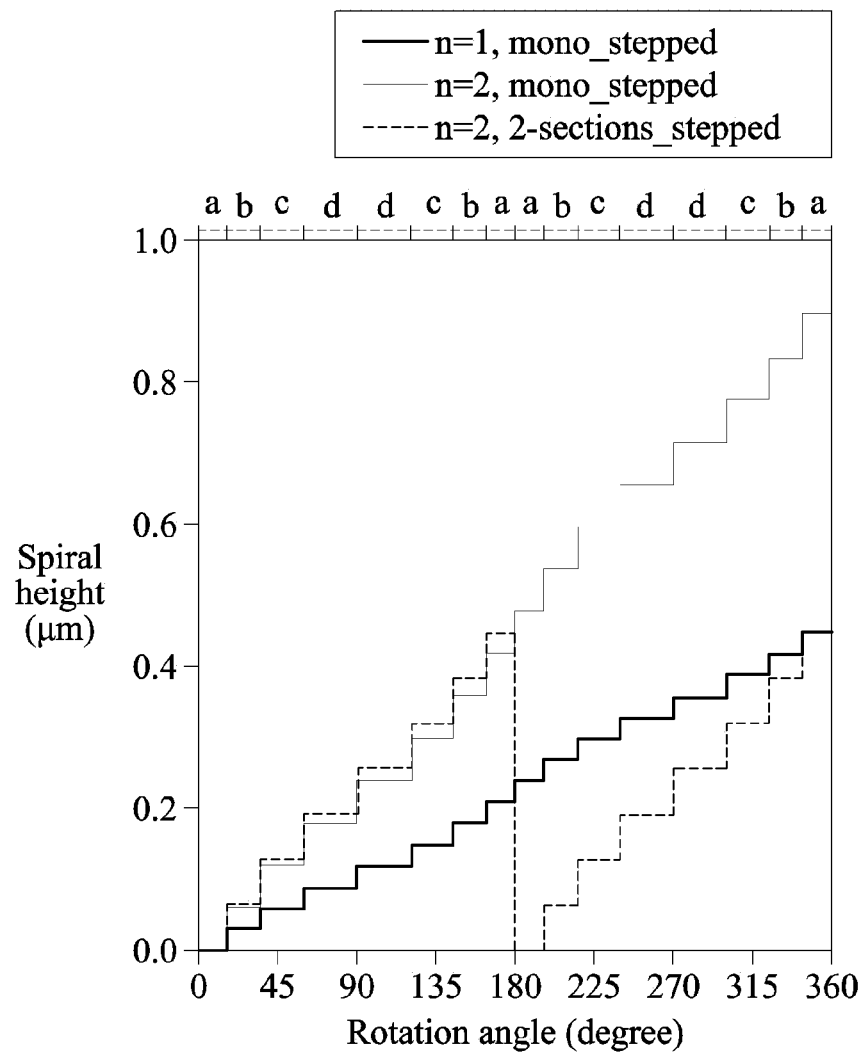
FIG. 12 is a graph illustrating a step height for each angle of a spiral phase plate designed to have a step height that increases in a stepwise manner according to an example embodiment.
Figure 13:
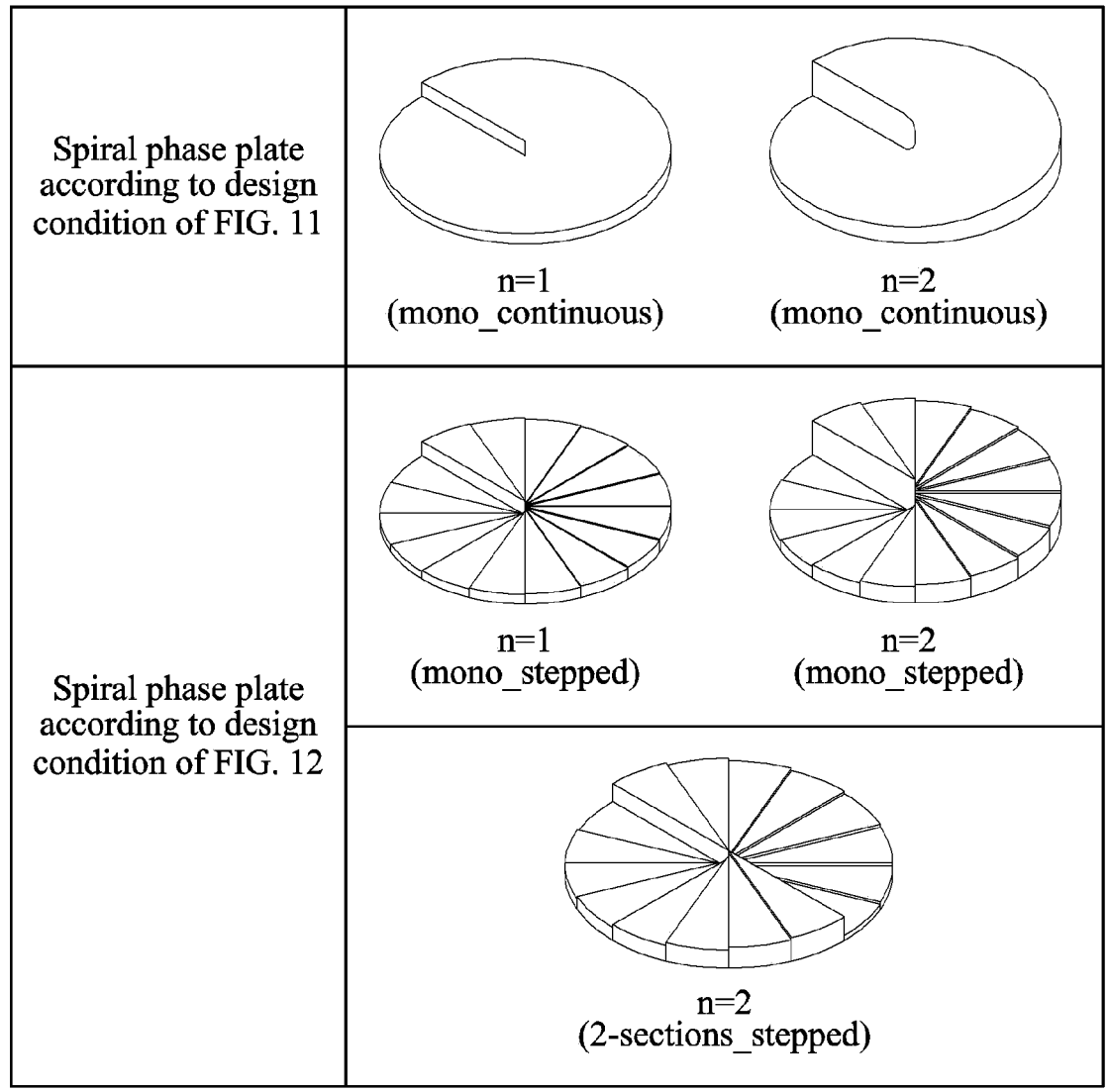
FIG. 13 is a diagram illustrating spiral phase plates respectively manufactured based on the design specifications illustrated in FIGS. 11 and 12.

FIG. 11 is a graph illustrating a step height for each angle of a spiral phase plate designed to have a step height that continuously increases according to an example embodiment, FIG. 12 is a graph illustrating a step height for each angle of a spiral phase plate designed to have a step height that increases in a stepwise manner according to an example embodiment, and FIG. 13 is a diagram illustrating spiral phase plates respectively manufactured based on the design specifications illustrated in FIGS. 11 and 12.

FIGS. 11 to 13 illustrate design specifications and design forms according to Equation 6 described above, and it can be confirmed that a problem of an intensity of a beam distributed for each phase being disproportionately formed can be solved when a reflective spiral phase plate according to the design is used.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

The invention claimed is:

1. A spiral phase plate for generating a Laguerre Gaussian beam by reflecting an incident beam emitted from a light source, the spiral phase plate comprising:
   a first quadrant area in which a step increase rate per unit angle decreases progressively in one direction from a point with a lowest step to a point with a highest step; and
   a second quadrant area in which a step increase rate per unit angle increases progressively in the one direction.

2. The spiral phase plate of claim 1, wherein the spiral phase plate further comprises:
   a third quadrant area in which a step height increase rate per unit angle is the same as that of the first quadrant area; and
   a fourth quadrant area in which a step height increase rate per unit angle is the same as that of the second quadrant area.

3. The spiral phase plate of claim 2, wherein the spiral phase plate is divided into a plurality of segments with a same step height according to a radial angle.

4. The spiral phase plate of claim 3, wherein, based on a direction in which a step size increases, a radial angle range occupied by the plurality of segments in the spiral phase plate sequentially increases in the first quadrant area and the third quadrant area, and sequentially decreases in the second quadrant area and the fourth quadrant area.

5. The spiral phase plate of claim 2, wherein the spiral phase plate has each step height that sequentially increases according to a radial angle.

6. The spiral phase plate of claim 5, wherein the spiral phase plate has a plurality of sections in which a step continuously increases according to a radial angle.

7. The spiral phase plate of claim 6, wherein the plurality of sections in which the step continuously increases in the spiral phase plate are formed at positions radially symmetrical to each other with respect to a line for dividing the respective first quadrant area, second quadrant area, third quadrant area, and fourth quadrant area.

8. The spiral phase plate of claim 1, wherein the spiral phase plate has a circular shape.

9. An apparatus for generating a Laguerre Gaussian beam, the apparatus comprising:
   a beam generator configured to emit an incident beam; and
   a spiral phase plate configured to generate a Laguerre Gaussian beam by reflecting an incident beam inputted from the beam generator,
   wherein the spiral phase plate comprises:
   a first quadrant area in which a step increase rate per unit angle decreases progressively in one direction from a point with a lowest step to a point with a highest step; and
   a second quadrant area in which a step increase rate per unit angle increases progressively in the one direction.

10. The apparatus of claim 9, wherein a height h from the point with the lowest step to the point with the highest step on the spiral phase plate is determined through Equation below, $$h = \frac{n\lambda}{2\cos\theta} \qquad \text{(Equation)}$$

(h: an overall step height of a spiral phase plate, n: a topological quantum number, $\lambda$: a wavelength of an incident beam, $\theta$: an incidence angle of an incident beam with respect to a spiral phase plate).

11. The apparatus of claim 10, wherein, at a point of a radial angle φ on the spiral phase plate, a relative height H to the point with the lowest step is determined through Equation below, $$H = \frac{n\lambda}{4\pi\cos\theta} \cdot \tan^{-1}\left[\frac{\tan\varphi}{\sec\theta}\right] \qquad \text{(Equation)}$$

(H: a step height at a specific phase angle, n: a phase quantum number, $\lambda$: a wavelength of an incident beam, $\theta$: an incidence angle of an incident beam with respect to a spiral phase plate, φ: a phase angle).

12. The apparatus of claim 11, wherein the spiral phase plate has a circular shape with a diameter of a length greater than or equal to a length of a major axis of an oval formed on the spiral phase plate by projecting the incident beam.

13. The apparatus of claim 12, wherein a portion extending in a radial direction from a central portion of the spiral phase plate having the circular shape has a same step.

* * * * *